Patented July 1, 1941

2,247,377

UNITED STATES PATENT OFFICE 2,247,377

OIL FILTER BLOCK COMPOSITION

Rolo D. Hill, Los Angeles, Calif., assignor of one-half to Guy S. Tucker, Los Angeles, Calif.

No Drawing. Application November 15, 1938,
Serial No. 240,517

2 Claims. (Cl. 210—205)

My invention relates to a filter block composition of a type used for filtering oil, however on account of the good heat insulating characteristics of the composition, my invention also comprehends the use of such material in the form of heat and sound insulating slabs or the equivalent. My invention resides in the various proportions of the composition and in the manner or method of making such composition and reducing it to the desired form in blocks or slabs required in filtering or for heat or sound insulating purposes.

Where my invention is utilized as an oil filter it may be made in the shape of a cylindrical block as depicted in my patent application for Oil filter, Ser. No. 152,123, filed July 6, 1937, issued January 31, 1939, to Patent No. 2,145,304 or it may be of a similar shape as illustrated in my patent application for Oil filter assembly, Ser. No. 240,516, filed November 15, 1938.

Among the various objects of my invention are the factors of developing a filter block or heat and sound insulating slab made of inexpensive material, some of which is waste material of certain industries of material of which it is difficult to find a profitable use and therefore such material may be purchased at a low price compared with other materials used for oil filtering or forming heat or sound insulating slabs. The main solid materials of my composition include wheat bran, wood pulp of the type used in blotting papers and short fiber asbestos such as used in making asbestos paper. The wheat bran functions as a filter, as a filler and binder and also to give porosity and therefore provide in an oil filter sufficient space for the accumulation of the adulterating material extracted from the oil where the invention is used for filtering. When used as a heat or sound insulator the porosity adds to the heat or sound insulating qualities and characteristics.

In view of the fact that the wheat bran, especially, is a product which is kept in stock for some time is attacked by various bugs, worms and mice, or other pests which will feed on a vegetable product of this type, it is desirable to render the material or the mixture proof against such attack without adding poisonous material. It is also necessary to use a material which on account of its presence will cause the different pests to avoid eating such material. It must also have the characteristic that it does not interfere with the oil filtering. Therefore, another feature of my invention is utilizing a small proportion of kerosene in the mixture to prevent attack by bugs, worms, mice and other pests. Instead of kerosene I may use other insecticides or incorporate pest deterrent.

A further feature of my invention resides in the manner of preparing the composition. The various solid ingredients may be in the proportions designated hereunder and thoroughly mixed into a pulp with free water to which the desired amount of kerosene has been added. The mixture is stirred or otherwise thoroughly agitated to secure an even distribution of the three main solid ingredients of the composition. This then while very wet and saturated with water is poured into suitable mold presses preferably with screens only at the bottom and top and then subjected to a compression vertically resulting in the removal of the surplus water. The press drying however is insufficient, therefore it is necessary to resort to drying to remove the additional surplus water. This may be done by air drying, done either out of doors where the conditions are suitable such as the air being dry also warm or indoor air drying, however I find it desirable to hasten the drying by oven drying. The action of the oven drying on the bran appears to be to partially toast this and give the product the odor and certain other characteristics of toast.

In my composition I may vary the three solid materials within quite wide ranges, these being by weight of the wheat bran from 50 to 75%, the wood pulp varying from a minimum of 10 to a maximum of 30%. The wheat bran may be of the commercial inexpensive variety sold on the market for chicken feed. This is not the highest quality of bran. The still better bran for my purpose is that designated in the trade as a washed bran. While I have designated the use of wheat bran in the composition, it is to be understood that brans of other cereals are suitable providing such brans are of such character that they develop the desired and suitable porosity, the porosity of the filter blocks depending in a great part on the bran and the proportions thereof in reference to the other materials. The wood pulp as above designated is of the type used in making blotting papers and has a considerable absorbent value. The asbestos is of the very short fiber of a type used in making asbestos paper.

Certain proportions may be illustrated as follows, for instance using an amount of bran of 50%, the wood pulp may be 25% and the asbestos 25% by weight. Again in a case in which I wish to use the maximum amount of bran 75%, the wood pulp may be 10% and the asbestos 15%. It is obvious that the percentages may vary considerably, thus presuming I desire to use a percentage of asbestos of 30%, the wood pulp may be 20% and the branch 50%. In cases in which I desire to use an amount of wood pulp of 25%, it would probably be desirable to lower the percentage of asbestos to about 20% making the bran 55%.

Another characteristic of the product is in the change of dimensions on the pressing and the drying. For instance when a cylindrical block is pressed to a length of about 5 inches and the pressure in the press is released, it will increase in length about $\frac{3}{16}$ of an inch while retaining substantially the same diameter. Then in the drying the block will shrink to have a final measurement in length of about 4⅞ inches while retaining the same diameter. When the cylindrical plug in a filter press is pressed to have flat ends, then in drying although these ends remain substantially flat, there is sometimes a slight narrowing of the diameter at the center so that a straight edge fitted longitudinally of the cylinder will exhibit a slight concave curve due to the contraction of the block between the two ends in diameter. This however is insufficient to change the characteristic of the block as to filtering through a cylinder. The slight difference in measurement is immaterial so far as the filtering is concerned. Therefore in the specification and claims where the block is specified as cylindrical it is intended to cover both a true cylinder and the slight distortion from the cylinder.

An important characteristic of my invention especially as to product is that although compressed a sufficient amount to form a good filter, nevertheless the filter block is materially lighter in weight than most of the filters of the same capacity now on the market. Where the material is used as a sound or heat insulator it is also quite light in weight compared with most other materials having similar characteristics and of the same efficiency. In addition as above mentioned, the materials from which the block or slab is made are quite inexpensive so that the resultant product may be less expensive than the equivalent articles now on the market of which I have knowledge.

In the manner in which my filter and others of this type are used, they are so connected to the forced oil circulation of the engine so that all of the oil does not pass through the filter. In fact, the filter may be considered as operating in a by-pass for the oil, therefore even if a filter should be used for too great a length of time and become so impregnated with adulterated material that it will not filter properly, nevertheless if there is sufficient oil in the crank case of an engine, there will be sufficient amount for lubrication, however, although only a relatively small proportion of the oil in circulation passes through the filter block at any specified time intervals, nevertheless on account of the thorough mixing of the oil, the filtering reduces the objectionable adulterance of the oil to a satisfactory amount when the filter of the proper composition is used with oil of the viscosity for which such composition is designed.

Various changes may be made in the details of the construction without departing from the spirit or scope of the invention as defined by the appended claims.

I claim:

1. An article as described, comprising a pressed and dried block or slab containing wheat bran, wood pulp of the type used in blotting paper and short fiber asbestos in which the bran has a minimum proportion of 50% to a maximum proportion of 75%, the wood pulp never being less than 10% and the asbestos never less than 15%.

2. An article as described, comprising a pressed and dried block or slab containing bran, wood pulp of the type used in blotting paper and short fiber asbestos varying in proportions by weight for filtering oil containing wood pulp from a minimum of 10% to a maximum of 30%, asbestos a minimum of 15% and bran from a minimum of 50% to a maximum of 75%.

ROLO D. HILL.